(12) United States Patent  
Nock et al.

(10) Patent No.: US 8,585,145 B2  
(45) Date of Patent: Nov. 19, 2013

(54) VEHICLE SEAT EASY ENTRY SYSTEM

(75) Inventors: Eckhard Nock, Wolnzach (DE);  
Johannes Barzen, Pfaffenhofen (DE);  
Christoph Warnken, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 91 days.

(21) Appl. No.: 13/349,046

(22) Filed: Jan. 12, 2012

(65) Prior Publication Data  
US 2012/0181833 A1 Jul. 19, 2012

Related U.S. Application Data

(60) Provisional application No. 61/432,858, filed on Jan. 14, 2011.

(30) Foreign Application Priority Data

Jan. 10, 2012 (DE) .......................... 10 2012 200 253

(51) Int. Cl.
*B60N 2/04* (2006.01)
*B60N 2/06* (2006.01)
*B60N 2/20* (2006.01)
*B60N 2/22* (2006.01)

(52) U.S. Cl.
USPC .. 297/341; 297/331; 297/378.12; 297/378.14

(58) Field of Classification Search
USPC ........................ 297/331, 341, 378.12, 378.14
See application file for complete search history.

(56) References Cited

U.S. PATENT DOCUMENTS

| | | | | | |
|---|---|---|---|---|---|
| 4,607,884 | A | * | 8/1986 | Heling | 297/341 |
| 4,621,867 | A | * | 11/1986 | Perring et al. | 297/341 |
| 4,634,180 | A | * | 1/1987 | Zaveri et al. | 297/341 |
| 4,707,030 | A | * | 11/1987 | Harding | 297/341 |
| 4,844,542 | A | * | 7/1989 | Humer | 297/341 |
| 5,531,503 | A | * | 7/1996 | Hughes | 297/341 |
| 5,597,206 | A | * | 1/1997 | Ainsworth et al. | 297/378.12 |
| 5,683,140 | A | * | 11/1997 | Roth et al. | 297/341 X |
| 5,695,247 | A | * | 12/1997 | Premji | 297/341 |
| 5,899,532 | A | * | 5/1999 | Paisley et al. | 297/341 |
| 5,927,809 | A | * | 7/1999 | Tame | 297/341 |
| 5,944,383 | A | | 8/1999 | Mathey et al. | |
| 6,036,267 | A | * | 3/2000 | Downey et al. | 297/341 |
| 6,086,154 | A | * | 7/2000 | Mathey et al. | 297/341 |
| 6,139,104 | A | * | 10/2000 | Brewer | 297/341 X |
| 6,152,533 | A | * | 11/2000 | Smuk | 297/341 |
| 6,195,603 | B1 | | 2/2001 | Gauger et al. | |
| 6,254,188 | B1 | * | 7/2001 | Downey | 297/341 |
| 6,439,531 | B1 | * | 8/2002 | Severini et al. | 297/341 X |
| 6,631,952 | B1 | * | 10/2003 | Liebetrau et al. | 297/341 |

(Continued)

*Primary Examiner* — Rodney B White  
(74) *Attorney, Agent, or Firm* — Brooks Kushman P.C.

(57) ABSTRACT

A vehicle seat easy entry system includes a vehicle seat having a seat bottom and a seat back. A seat track assembly receives the vehicle seat and selectively allows forward and rearward travel of the seat bottom. A seat track locking mechanism is engageable to lock the seat bottom with respect to the seat track assembly. A recliner mechanism controls an orientation of the seat back. The recliner mechanism is engageable to lock the seat back with respect to the seat bottom. An easy entry handle is arranged such that assertion of the easy entry handle releases the seat track locking mechanism. The seat track assembly and the recliner mechanism are configured such that movement of the seat bottom to a forward position releases the recliner mechanism, thereby allowing the seat back to rotate to an easy entry position.

19 Claims, 2 Drawing Sheets

(56) References Cited

U.S. PATENT DOCUMENTS

| | | | |
|---|---|---|---|
| 6,733,076 B2 * | 5/2004 | Grable et al. | 297/378.12 X |
| 6,767,063 B1 * | 7/2004 | Abdella et al. | 297/378.12 |
| 6,827,404 B2 * | 12/2004 | Blair et al. | 297/378.12 |
| 6,926,364 B2 * | 8/2005 | Cooley et al. | 297/378.12 |
| 7,021,716 B2 | 4/2006 | Persad et al. | |
| 7,090,188 B2 * | 8/2006 | Severini et al. | 297/341 X |
| 7,204,556 B2 * | 4/2007 | Schwerdtner et al. | 297/378.12 |
| 7,517,022 B2 * | 4/2009 | Habedank et al. | 297/378.12 |
| 7,648,206 B2 * | 1/2010 | Wieclawski | 297/378.12 |
| 7,686,397 B2 | 3/2010 | Sahi | |
| 7,819,479 B2 * | 10/2010 | Halbig et al. | 297/378.14 |
| 7,926,875 B2 | 4/2011 | Schmale | |
| 7,963,608 B2 | 6/2011 | Wieclawski | |
| 7,971,938 B2 | 7/2011 | Wieclawski | |
| 8,091,945 B2 | 1/2012 | Hancock et al. | |
| 8,141,953 B2 * | 3/2012 | Quast et al. | 297/341 |
| 8,439,444 B2 * | 5/2013 | Ngiau | 297/378.12 |
| 2003/0122412 A1 * | 7/2003 | Niimi et al. | 297/341 |
| 2007/0246985 A1 * | 10/2007 | Sahi | 297/331 |
| 2008/0296950 A1 * | 12/2008 | Wieclawski | 297/378.12 |
| 2009/0096270 A1 * | 4/2009 | Halbig et al. | 297/378.12 |
| 2012/0062012 A1 * | 3/2012 | Miller et al. | 297/378.12 |

* cited by examiner

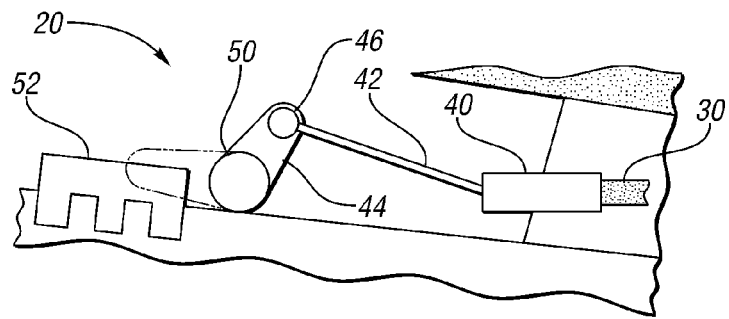
*Fig. 3*
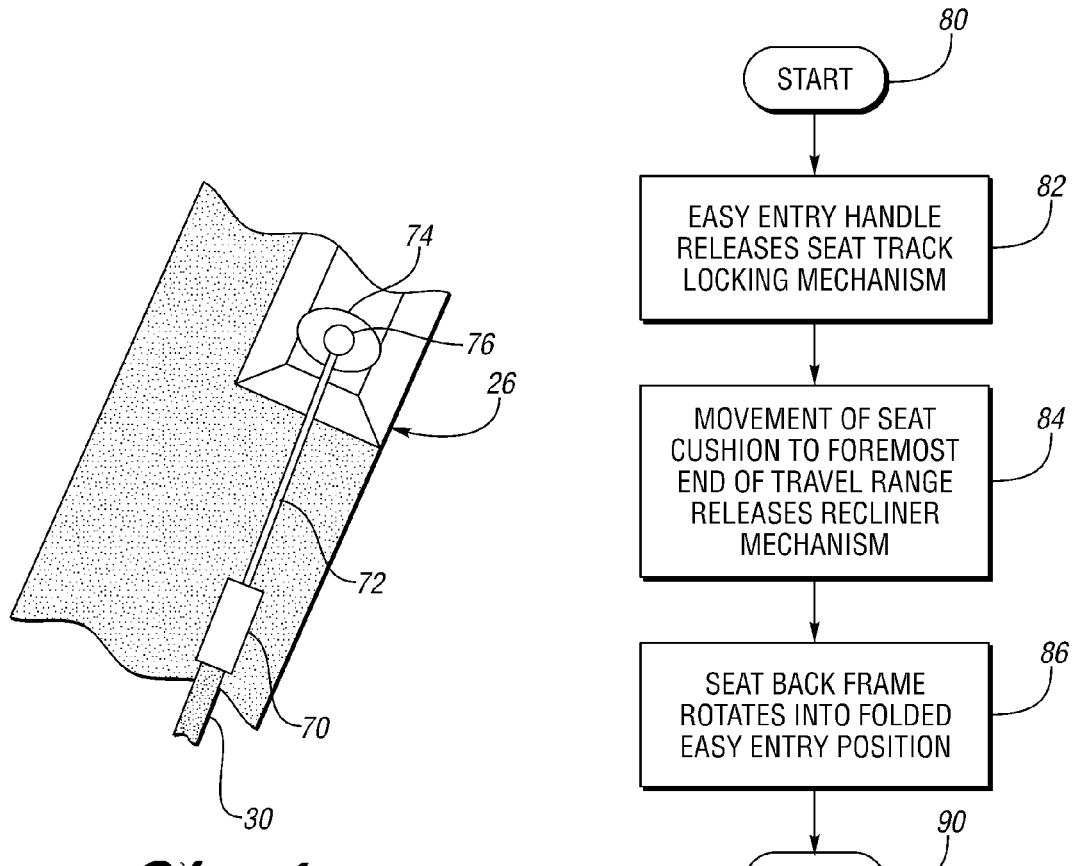
*Fig. 4*
*Fig. 5*

VEHICLE SEAT EASY ENTRY SYSTEM

CROSS-REFERENCE TO RELATED APPLICATION

This application claims the benefit of U.S. provisional application No. 61/432,858, filed Jan. 14, 2011 and claims foreign priority benefits under 35 U.S.C. §119(a)-(d) to DE 10 2012 200 253.7, filed Jan. 10, 2012, the disclosures of which are hereby incorporated by reference in their entirety.

TECHNICAL FIELD

The invention relates to all rows vehicle seating and other vehicle or non-vehicle seating environments where it may be desirable to slide a seat forwardly in an easy motion in order to provide access to an area behind the seat or otherwise obstructed by the seat.

BACKGROUND

Background information may be found in U.S. Pat. Nos. 7,971,938, 7,963,608, and 6,195,603, which are hereby incorporated by reference.

SUMMARY

In one embodiment, a vehicle seat easy entry system comprises a vehicle seat including a seat bottom and a seat back. The system further comprises a seat track assembly including a seat track locking mechanism. The seat track assembly receives the vehicle seat and selectively allows forward and rearward travel of the seat bottom with respect to the seat track assembly. The seat track locking mechanism is engageable to lock the seat bottom with respect to the seat track assembly.

A recliner mechanism controls an orientation of the seat back with respect to the seat bottom. The recliner mechanism is engageable to lock the seat back with respect to the seat bottom. An easy entry handle is arranged such that assertion of the easy entry handle releases the seat track locking mechanism.

The seat track assembly and the recliner mechanism are configured such that movement of the seat bottom to a forward position releases the recliner mechanism. This allows the seat back to rotate to an easy entry position.

It is appreciated that embodiments of the invention may be implemented in a variety of ways. Embodiments of the invention may include one or more of various additional features, depending on the application.

In one possible feature, the seat track assembly allows forward and rearward travel of the seat bottom over a travel range including the forward position, a plurality of middle positions, and a rearward position. In another possible feature, the recliner mechanism allows rotation of the seat back with respect to the seat bottom over a travel range between the easy entry position and a seating position.

The easy entry handle may be located at the seat back. The easy entry handle may also be located at another location as appropriate for a particular application. A tow bar may operatively connect to the seat track assembly to allow a user to manually adjust a position of the seat bottom.

In one aspect, a seat slide may be designed with two forward end stops. The first stop is for comfort adjustment. Operating a seat slide handle would not allow travel over the first stop. The second stop is for easy entry and is linked to the easy entry handle. The second stop can be reached only when the easy entry handle was used. In this approach, the full forward comfort sliding position does not release the seat back. Embodiments of the invention are suitable for a variety of easy entry recliner applications. There may be two locking systems; comfort and easy entry travel or a combined system as appropriate for the particular implementation.

Embodiments of the invention, as appropriate, may use appropriate mechanical or electrical connections between various components to achieve the desired functions. In one embodiment, a cable arrangement connects the easy entry handle and the seat track locking mechanism.

In another embodiment of the invention, a vehicle seat easy entry system comprises a vehicle seat including a seat bottom and a seat back; and a seat track assembly including a seat track locking mechanism. The seat track assembly receives the vehicle seat and selectively allows forward and rearward travel of the seat bottom with respect to the seat track assembly over a travel range including a forward position, a plurality of middle positions, and a rearward position. The seat track locking mechanism is engageable to lock the seat bottom with respect to the seat track assembly.

A recliner mechanism controls an orientation of the seat back with respect to the seat bottom to allow rotation of the seat back with respect to the seat bottom over a travel range between an easy entry position and a seating position.

The recliner mechanism is engageable to lock the seat back with respect to the seat bottom. An easy entry handle is arranged such that assertion of the easy entry handle releases the seat track locking mechanism.

The seat track assembly and the recliner mechanism are configured such that movement of the seat bottom to the forward position releases the recliner mechanism. This allows the seat back to rotate to the easy entry position.

BRIEF DESCRIPTION OF THE DRAWINGS

FIG. 3 illustrates an enlarged view showing the cable arrangement connection to the seat track locking mechanism or any release mechanism;

FIG. 4 illustrates an enlarged view showing the cable arrangement connection to the easy entry handle or any other connection;

FIG. 5 illustrates operation of a seat in an embodiment of the invention.

DETAILED DESCRIPTION

Figure 1:
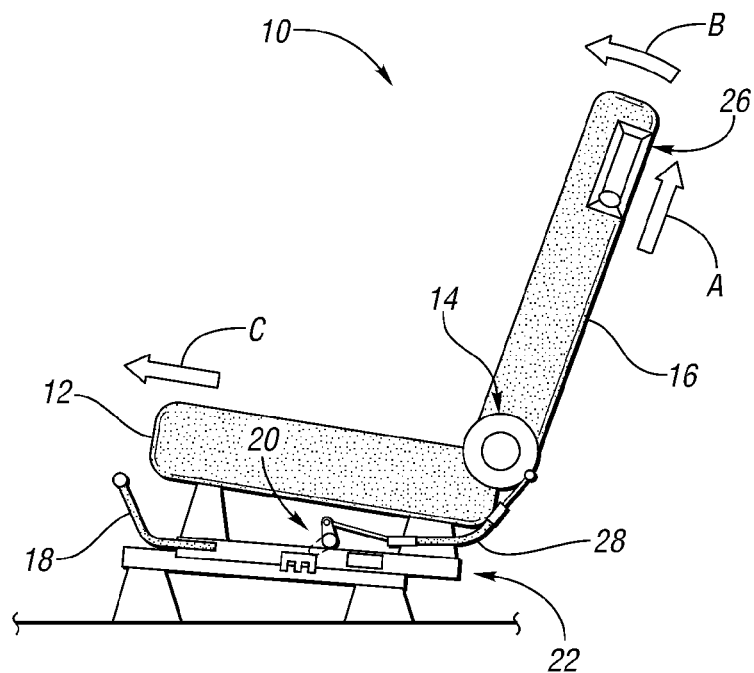
FIG. 1 illustrates a seat.

FIG. 1 illustrates a seat 10 including a vehicle seat easy entry system. A vehicle seat includes a seat bottom 12, a recliner mechanism 14, and a seat back 16. Recliner mechanism 14 controls an orientation of seat back 16 with respect to seat bottom 12 to allow rotation of seat back 16 with respect to seat bottom 12 over a travel range between an easy entry position and a seating position. Recliner mechanism 14 is engageable to lock seat back 16 with respect to seat bottom 12.

A tow bar 18 is operatively connected to a seat track locking mechanism 20 to allow a user to manually adjust a position of the seat bottom 12. Seat track locking mechanism 20 is included as part of a seat track assembly 22 receiving the vehicle seat and selectively allowing forward and rearward travel of seat bottom 12 with respect to seat track assembly 22. Seat track assembly 22 allows forward and rearward travel of seat bottom 12 over a travel range including a forward position, a plurality of middle positions, and a rearward position.

Seat track locking mechanism 20 is engageable to lock seat bottom 12 with respect to seat track assembly 22. An easy entry handle 26 is shown. In FIG. 1, a cable arrangement 28 connects recliner mechanism 14 and seat track locking mechanism 20.

In FIG. 1, easy entry handle 26 opens recliner mechanism 14 (arrow A) and the rotation of the back frame back 16 (arrow B) into an easy entry position releases the seat track locking mechanism 20, allowing the seat to be moved forward to the easy entry position (arrow C).

Figure 2:
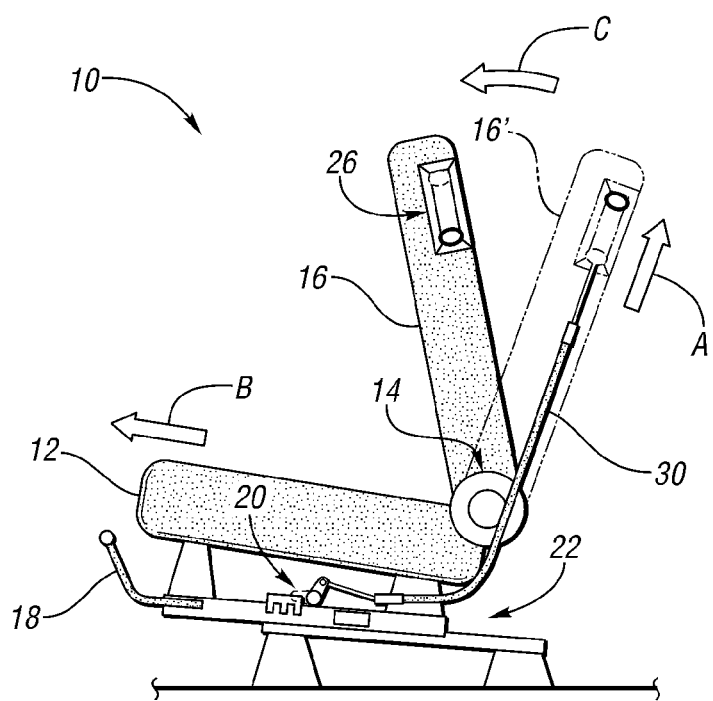
FIG. 2 illustrates a seat in an embodiment including a cable arrangement connecting the easy entry handle and the seat track locking mechanism.

FIG. 2 illustrates a second row seat in an embodiment of the invention including a cable arrangement 30 connecting the easy entry handle 26 and the seat track locking mechanism 20. As shown, easy entry handle 26 is located at seat back 16. In this embodiment of the invention, easy entry handle 26 is arranged such that assertion (arrow A) of easy entry handle 26 releases seat track locking mechanism 20. Seat track assembly 22 and recliner mechanism 14 are configured such that movement (arrow B) of seat bottom 12 to the forward position releases recliner mechanism 14. This allows seat back 16 to rotate (arrow C) to the easy entry position. The original, seating position for the seat back is indicated at 16'.

It is appreciated that in the embodiment of the invention shown in FIG. 2, easy entry handle 26 utilizes seat track locking mechanism 20 to open the tracks, and the movement of seat bottom 12 to the forward position releases recliner mechanism 14. Embodiments of the invention may use appropriate mechanical or electrical connections between various components to achieve the desired functions. For example, cable arrangement 30 could be replaced with an alternative connection. Further, the cooperation of seat track assembly 22 and recliner mechanism 14 may be implemented in a variety of ways to cause appropriate release of the recliner mechanism 14.

FIG. 3 illustrates an enlarged view showing the cable arrangement 30 connection to the seat track locking mechanism 20. In further detail, cable arrangement 30 may be a Bowden cable with an inner cable 42 protruding from an end 40 of the outer housing. Seat track locking mechanism 20 includes element 44 with connection 46 to inner cable 42, and further includes pivot part 50 and stop member 52.

FIG. 4 illustrates an enlarged view showing the cable arrangement 30 connection to the easy entry handle 26. In further detail, cable arrangement 30 may be a Bowden cable with an inner cable 72 protruding from an end 70 of the outer housing. Easy entry handle 26 includes element 74 and connection 76 to inner cable 72.

FIG. 5 illustrates operation of a second row seat in an embodiment of the invention. Flow starts at block 80. At block 82, the easy entry handle causes the release of the seat track locking mechanism. This may occur in a variety of different ways, and is not limited to the use of a cable arrangement. At block 84, movement of the seat cushion to the foremost end of travel range releases the recliner mechanism. At block 86, the seat back frame may be rotated into the folded, easy entry position. Flow ends at block 90.

A seat slide may be designed with two forward end stops. The first stop is for comfort adjustment. Operating a seat slide handle would not allow travel over the first stop. The second stop is for easy entry and is linked to the easy entry handle. The second stop can be reached only when the easy entry handle was used. In this approach, the full forward comfort sliding position does not release the seat back.

While not intending to limit the present invention to vehicles or vehicle seating, the present invention is predominately described with respect to supporting easy entry of the type where at least a portion of the seat is easily slid or otherwise adjusted to permit access to an area behind the seat, such as to facilitate entering a third row of seats or placement of an object behind the seat. The present invention is also predominately described with respect to being manually actuated in that cables, levers, latches, locks, and other mechanical items are actuated to facilitate the contemplated movements with forces and energy provided manually by a user, which may optionally operate in cooperation with springs and other mechanical elements. The present invention fully contemplates any one or more of the movements associated with the easy entry being similarly performed with motors or other electro-mechanically controlled actions.

The easy entry movement contemplated by one non-limiting aspect of the present invention includes sliding a seat bottom 12 forwardly prior to releasing a recliner mechanism 14 and freeing a seat back 16 to pivot forward toward a fold-flat or other forward leaning position. An easy entry lever 26 may be included at a top or other location of the seat back to instigate easy entry movement. This may include the user lifting the lever in a manner that causes a cable to actuate the seat track locking mechanism to free the seat bottom for movement. The user may then apply force to the seat back to cause the entire seat, i.e., seat back and seat bottom, to slide forwardly to the position shown in FIG. 2. Once the seat travels a sufficient distance forwardly of the comfort zone (distance beyond where the seat bottom may be adjusted with the tow bar and yet remain in a lockable position), the present invention contemplates only then releasing the reclining mechanism to permit the seat back to fold forwardly with the user applied force. In this regard, the easy entry contemplated by one non-limiting aspect of the present invention requires the seat bottom to slide forwardly past a comfort zone before the release mechanism is automatically released (with cable, signal etc.) and the seat back can fold forwardly.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A vehicle seat easy entry system comprising:
   a vehicle seat including a seat bottom and a seat back;
   a seat track assembly including a seat track locking mechanism, the seat track assembly receiving the vehicle seat and selectively allowing forward and rearward travel of the seat bottom with respect to a portion of the seat track assembly, the seat track locking mechanism being engageable to lock the seat bottom with respect to the portion of the seat track assembly;

a recliner mechanism for controlling an orientation of the seat back with respect to the seat bottom, the recliner mechanism being engageable to lock the seat back with respect to the seat bottom; and an easy entry handle arranged such that assertion of the easy entry handle releases the seat track locking mechanism;

wherein the seat track assembly and the recliner mechanism are configured such that movement of the seat bottom to a forward position releases the recliner mechanism, thereby allowing the seat back to rotate to an easy entry position.

2. The vehicle seat easy entry system of claim 1 wherein the seat track assembly allows forward and rearward travel of the seat bottom over a travel range including the forward position, a plurality of middle positions, and a rearward position.

3. The vehicle seat easy entry system of claim 1 wherein the recliner mechanism allows rotation of the seat back with respect to the seat bottom over a travel range between the easy entry position and a seating position.

4. The vehicle seat easy entry system of claim 1 wherein the easy entry handle is located at the seat back.

5. The vehicle seat easy entry system of claim 1 further comprising:
a tow bar operatively connected to the seat track assembly to allow a user to manually adjust a position of the seat bottom.

6. The vehicle seat easy entry system of claim 1 further comprising:
a cable arrangement connecting the easy entry handle and the seat track locking mechanism.

7. The vehicle seat easy entry system of claim 6 wherein the seat track assembly allows forward and rearward travel of the seat bottom over a travel range including the forward position, a plurality of middle positions, and a rearward position.

8. The vehicle seat easy entry system of claim 6 wherein the recliner mechanism allows rotation of the seat back with respect to the seat bottom over a travel range between the easy entry position and a seating position.

9. The vehicle seat easy entry system of claim 6 wherein the easy entry handle is located at the seat back.

10. The vehicle seat easy entry system of claim 6 further comprising:
a tow bar operatively connected to the seat track assembly to allow a user to manually adjust a position of the seat bottom.

11. A vehicle seat easy entry system comprising:
a vehicle seat including a seat bottom and a seat back;
a seat track assembly including a seat track locking mechanism, the seat track assembly receiving the vehicle seat and selectively allowing forward and rearward travel of the seat bottom with respect to a portion of the seat track assembly over a travel range including a forward position, a plurality of middle positions, and a rearward position, the seat track locking mechanism being engageable to lock the seat bottom with respect to the portion of the seat track assembly;
a recliner mechanism for controlling an orientation of the seat back with respect to the seat bottom to allow rotation of the seat back with respect to the seat bottom over a travel range between an easy entry position and a seating position, the recliner mechanism being engageable to lock the seat back with respect to the seat bottom; and
an easy entry handle arranged such that assertion of the easy entry handle releases the seat track locking mechanism;

wherein the seat track assembly and the recliner mechanism are configured such that movement of the seat bottom to the forward position releases the recliner mechanism, thereby allowing the seat back to rotate to the easy entry position.

12. The vehicle seat easy entry system of claim 11 wherein the easy entry handle is located at the seat back.

13. The vehicle seat easy entry system of claim 11 further comprising:
a tow bar operatively connected to the seat track assembly to allow a user to manually adjust a position of the seat bottom.

14. The vehicle seat easy entry system of claim 11 further comprising:
a cable arrangement connecting the easy entry handle and the seat track locking mechanism.

15. The vehicle seat easy entry system of claim 14 wherein the easy entry handle is located at the seat back.

16. The vehicle seat easy entry system of claim 14 further comprising:
a tow bar operatively connected to the seat track assembly to allow a user to manually adjust a position of the seat bottom.

17. The vehicle seat easy entry system of claim 11 further comprising:
a tow bar operatively connected to the seat track assembly to allow a user to manually adjust a position of the seat bottom, wherein a first stop limits forward movement of the seat bottom caused by operation of the tow bar, and a second stop forward of the first stop limits forward movement of the seat bottom when the easy entry handle was asserted.

18. The vehicle seat easy entry system of claim 1 further comprising:
a tow bar operatively connected to the seat track assembly to allow a user to manually adjust a position of the seat bottom within a first range of forward and rearward travel, wherein a first stop limits forward movement of the seat bottom caused by operation of the tow bar, and a second stop forward of the first stop limits forward movement of the seat bottom when the easy entry handle was asserted.

19. A vehicle seat with an easy entry system comprising:
a vehicle seat including a seat bottom and a seat back;
a seat track assembly including a seat track locking mechanism, the seat track assembly receiving the vehicle seat and selectively allowing forward and rearward travel of the seat bottom with respect to a portion of the seat track assembly, the seat track locking mechanism being engageable to lock the seat bottom with respect to the portion of the seat track assembly;
a recliner mechanism configured to control an orientation of the seat back with respect to the seat bottom, the recliner mechanism being engageable to lock the seat back with respect to the seat bottom;
a tow bar operatively connected to the seat track assembly to allow a user to manually adjust a position of the seat bottom within a first range of the forward and rearward travel, wherein a first stop limits forward movement of the seat bottom caused by operation of the tow bar; and
an easy entry handle that is actuatable to release the seat track locking mechanism to allow the seat bottom to move forward past the first stop to thereby release the recliner mechanism and allow the seat back to rotate to an easy entry position.

* * * * *